US012420720B2

(12) United States Patent
Labbe et al.

(10) Patent No.: US 12,420,720 B2
(45) Date of Patent: Sep. 23, 2025

(54) ACCESSORY RACK ASSEMBLY AND ACCESSORY RACK KIT

(71) Applicant: BOMBARDIER RECREATIONAL PRODUCTS INC., Valcourt (CA)

(72) Inventors: Christian Labbe, Magog (CA); Jonathan Asselin, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 819 days.

(21) Appl. No.: 17/678,129

(22) Filed: Feb. 23, 2022

(65) Prior Publication Data
US 2022/0274534 A1    Sep. 1, 2022

Related U.S. Application Data

(60) Provisional application No. 63/154,238, filed on Feb. 26, 2021.

(51) Int. Cl.
*B60R 9/12*    (2006.01)
*A63C 11/02*   (2006.01)
*B62B 17/00*   (2006.01)

(52) U.S. Cl.
CPC ............. *B60R 9/12* (2013.01); *A63C 11/025* (2013.01); *B62B 17/00* (2013.01)

(58) Field of Classification Search
CPC ........... B60R 9/12; B60R 9/045; B60R 9/048; B62B 17/06; B62B 2202/401;

(Continued)

(56) References Cited

U.S. PATENT DOCUMENTS 2,288,442 A * 6/1942 Felton .................... A01K 97/10
                                                  248/231.91
2,529,285 A * 11/1950 Felton ...................... B60R 9/08
                                                  224/558

(Continued)

FOREIGN PATENT DOCUMENTS

CA    2074801 A1    8/1991
DE    2040962 A1 *  2/1972
(Continued)

OTHER PUBLICATIONS

BRP; Tow Pro; retrieved from https://shop.sea-doo.com/us/en/295100605-tow-pro.html on Jun. 13, 2022.
(Continued)

*Primary Examiner* — Hilary L Gutman
(74) *Attorney, Agent, or Firm* — BCF LLP

(57) ABSTRACT

An accessory rack assembly for connecting to a vehicle including a rack structure including: a first rack component; a second rack component connected to the first rack component; and at least one protrusion, the first rack component and the second rack component extending in a same direction from the first and third end portions, the first rack component and the second rack component defining an accessory passage therebetween, the at least one protrusion extending from the first rack component into the accessory passage, the at least one protrusion separating the accessory passage into a first passage portion and a second passage portion, the at least one protrusion being configured for separating one object disposed in the first passage portion from another object disposed in the second passage portion, and a securing member selectively extending over the top end portions to selectively partially close the top opening.

21 Claims, 13 Drawing Sheets

(58) Field of Classification Search
CPC ..... A63C 11/025; A63C 11/02; A63C 11/021; A63C 11/023
USPC .......................................................... 296/3
See application file for complete search history.

(56) References Cited

U.S. PATENT DOCUMENTS

| | | | | |
|---|---|---|---|---|
| 2,718,370 | A * | 9/1955 | Carrier, Jr. | B60R 9/08 224/570 |
| 3,262,619 | A * | 7/1966 | Selnes | A63C 11/025 294/147 |
| 3,275,160 | A * | 9/1966 | Zurker | B60R 9/12 248/214 |
| 3,892,343 | A * | 7/1975 | Warner | A63C 11/025 294/147 |
| 3,935,977 | A * | 2/1976 | Bonnett | A63C 11/025 294/147 |
| 3,990,655 | A * | 11/1976 | Covell | A63C 11/009 24/329 |
| 4,059,209 | A * | 11/1977 | Grisel | A63C 11/009 294/143 |
| 4,171,759 | A * | 10/1979 | Wnek | B60R 9/12 294/143 |
| 4,221,314 | A * | 9/1980 | Baker, Jr. | A63C 11/025 24/302 |
| 4,274,571 | A * | 6/1981 | Lafreniere | A63C 11/025 294/147 |
| 4,278,192 | A * | 7/1981 | Sazegar | B60R 9/12 224/325 |
| 4,294,387 | A * | 10/1981 | Wnek | B60R 9/12 294/143 |
| 4,460,207 | A * | 7/1984 | Gies | A63C 11/025 294/147 |
| 4,479,674 | A * | 10/1984 | Nordmeyer | A63C 11/009 294/147 |
| 4,863,082 | A * | 9/1989 | Evans | B63B 32/83 224/406 |
| 5,119,980 | A | 6/1992 | Grim et al. | |
| 5,184,863 | A * | 2/1993 | Hurson | A63C 11/025 294/147 |
| 5,316,192 | A * | 5/1994 | Ng | B60R 9/048 224/324 |
| 5,361,954 | A * | 11/1994 | Tura | E05B 73/0005 224/257 |
| 5,383,589 | A * | 1/1995 | Tracy | B60R 9/04 224/325 |
| 5,460,310 | A * | 10/1995 | Fabbri Corsarini | B60R 9/12 224/315 |
| 5,516,019 | A * | 5/1996 | Moon | B60R 9/058 248/205.8 |
| 5,657,913 | A | 8/1997 | Cucheran et al. | |
| 5,673,832 | A * | 10/1997 | Whalen | B60R 9/12 224/917.5 |
| 6,189,753 | B1 * | 2/2001 | Kalhok | B63B 32/83 224/406 |
| 6,588,817 | B1 * | 7/2003 | Wadeyka | A63C 11/023 220/826 |
| 6,789,712 | B2 * | 9/2004 | Gates | B60R 9/048 224/446 |
| 8,622,266 | B2 * | 1/2014 | McMillan | B60R 3/007 224/323 |
| 9,376,063 | B2 * | 6/2016 | Hein | B60R 9/06 |
| 9,429,269 | B2 * | 8/2016 | Wilhelm | B60R 9/12 |
| 9,751,592 | B2 | 9/2017 | Labbe et al. | |
| 10,744,953 | B2 | 8/2020 | Labbe et al. | |
| 12,122,487 | B2 * | 10/2024 | Wilson | B63B 32/83 |
| 2008/0272165 | A1 * | 11/2008 | McMillan | B60R 9/12 224/408 |
| 2015/0174975 | A1 * | 6/2015 | Tomassen | B62M 27/00 224/408 |
| 2023/0294615 | A1 * | 9/2023 | Wicken | B60R 9/06 211/85.8 |

FOREIGN PATENT DOCUMENTS

| | | | | |
|---|---|---|---|---|
| DE | 3344611 | A * | 6/1985 | ............ B60R 9/12 |
| DE | 3516888 | A * | 11/1986 | ............ B60R 9/12 |
| EP | 558992 | A1 * | 9/1993 | ............ B60R 9/12 |
| FR | 1456946 | A * | 7/1966 | |
| FR | 2431396 | A * | 3/1980 | ............ B60R 9/12 |
| FR | 2434055 | A * | 4/1980 | ............ B60R 9/12 |
| FR | 2506698 | A * | 12/1982 | ............ B60R 9/12 |
| FR | 2506698 | A1 * | 12/1982 | |
| WO | WO-8102525 | A * | 9/1981 | .......... A63C 11/023 |
| WO | WO-9111344 | A * | 8/1991 | ............ B60R 9/048 |

OTHER PUBLICATIONS

BRP; Wakeboard Rack; retrieved from https://shop.sea-doo.com/us/en/295100838-wakeboard-rack.html on Jun. 13, 2022.

* cited by examiner

ACCESSORY RACK ASSEMBLY AND ACCESSORY RACK KIT

CROSS-REFERENCE

The present application claims priority to U.S. Provisional Patent Application No. 63/154,238, entitled "Accessory Rack Assembly and Accessory Rack Kit," filed on Feb. 26, 2021, the entirety being incorporated herein by reference.

FIELD OF TECHNOLOGY

The present technology relates to accessory rack assemblies and accessory rack kits for vehicles.

BACKGROUND

Off-road vehicles, such as snowmobiles and the like, are used for both utility and recreational purposes. These vehicles are sometimes used to carry winter sports equipment, such as skis and snowboards, for which equipment racks are sometimes provided.

In many cases, however, a specific equipment rack is needed for a given model or type of equipment. For instance, in order to carry skis or a snowboard, two different equipment racks are often needed. Additionally, in order to transport both skis and ski poles, the skis and poles are often strapped together. This may not be as secure as securing the skis and poles separately and may further result in damage to the skis and/or poles. In order to separate the skis and poles, however, an additional rack may be required.

Therefore, there is a desire for a solution for off-road vehicles to provide flexibility in equipment transport.

SUMMARY

It is an object of the present technology to ameliorate at least some of the inconveniences present in the prior art.

According to one aspect of the present technology, there is provided an accessory rack assembly, and rack kits includes one or more assemblies, for selectively securing elongated objects, especially skis, ski poles, and snowboards, to an off-road vehicle. The assembly has a generally U-shaped structure for receiving skis, ski poles, and/or snowboards therein. The width of the passage in which the cargo is received is adjustable using a ratchet strap securing member, which allows different models of sports equipment to be adapted to. The rack structure includes a protrusion extending into a central portion of the receiving passage to allow both skis and ski poles to be secured in the rack structure, while separating the skis from the ski poles. The lower portion of the receiving passage also includes a deformable portion to maintain the ski poles in place when secured therein, without restriction to the specific size or form of the poles.

According to one aspect of the present technology, there is provided an accessory rack assembly for connecting to a vehicle. The assembly includes a rack structure including: a first rack component including a first end portion and a second end portion opposite the first end portion; a second rack component including a third end portion and a fourth end portion, the third end portion of the second rack component being connected to the first end portion of the first rack component; and at least one protrusion connected to and extending outward from at least one of a first surface of the first rack component and a second surface of the second rack component, the first surface extending between the first end portion and the second end portion, the second surface extending between the third end portion and the fourth end portion, the first rack component and the second rack component extending in a same direction from the first and third end portions, the first rack component and the second rack component defining an accessory passage therebetween, the at least one protrusion extending from the first rack component into the accessory passage, the at least one protrusion separating the accessory passage into a first passage portion and a second passage portion, the at least one protrusion being configured for separating an at least one first object disposed in the first passage portion from an at least one second object disposed in the second passage portion, the second end of the first rack component and the fourth end of the second rack component defining therebetween a top opening of the accessory passage, a width of the top opening between the second end and the fourth end being changeable by movement of the second rack component relative to the first rack component; and a securing member selectively connected to the rack structure, the securing member extending over the second end portion and the fourth end portion to selectively partially close the top opening.

In some embodiments, the rack structure formed by the first rack component and the second rack component is generally U-shaped.

In some embodiments, the first rack component includes a compressible portion extending from the first rack component into at least one of the first passage portion and the second passage portion.

In some embodiments, the compressible portion includes a plurality of flexible members extending into the at least one of the first passage portion and the second passage portion.

In some embodiments, the second passage portion is located between the first end portion and the third end portion connected together and the at least one protrusion; and the compressible portion extends into the second passage portion.

In some embodiments, the at least one protrusion is a protrusion extending from the first rack component across a majority of the accessory passage.

In some embodiments, the first passage portion has a first height extending along the first surface; the second passage portion has a second height extending along the first surface; the second rack component and the protrusion are arranged to secure an at least one third object in the accessory passage, a height of the at least one third object being greater than the first height of the first passage portion and the second height of the second passage portion; and when received in the accessory passage: the at least one third object extends into the first passage portion and the second passage portion, and the at least one third object is disposed between the protrusion and the second rack component.

In some embodiments, the at least one third object is a snowboard.

In some embodiments, the securing member is configured to be selectively tightened around the rack structure, the fourth end of the second rack component being flexed toward the second end of the first rack component when the securing member is at least partially tightened around the rack structure.

In some embodiments, the assembly further including at least one ratchet buckle connected to the rack structure; and the securing member includes at least one ratchet strap; and the at least one ratchet buckle is arranged to selectively receive and tighten the at least one ratchet strap.

In some embodiments, the securing member includes a center rigid member; a first strap connected to and extending from a first end of the center rigid member; and a second strap connected to and extending from a second end of the center rigid member.

In some embodiments, the center rigid member has an arc shape; and the center rigid member is sized and arranged, when connected to the rack structure, to extend around and over the second end of the first rack component and the fourth end of the second rack component.

In some embodiments, the securing member includes a deformable material layer connected to an inner surface of the center rigid member.

In some embodiments, the first strap is a first ladder strap; and the second strap is a second ladder strap; and the rack structure includes: a first ratchet buckle connected to a first exterior surface of the rack structure, the first ratchet buckle being arranged to selectively receive the first ladder strap, and a second ratchet buckle connected to a second exterior surface of the rack structure, the second ratchet buckle being arranged to selectively receive the second ladder strap.

In some embodiments, the assembly further includes an attachment frame connected to the rack structure and configured for selectively connecting the rack structure to the vehicle.

In some embodiments, the first rack component is fastened to the attachment frame.

In some embodiments, the vehicle is a snowmobile including a tunnel; and the attachment frame includes a top frame portion arranged for connecting to a top surface of the tunnel, an aperture being defined in the top frame portion, the aperture being sized and arranged for receiving an accessory anchor therethrough.

In some embodiments, the attachment frame includes a side frame portion extending generally downward from the top frame portion, the side frame portion defining a through-hole therethrough for receiving a fastener for connecting to a side of the tunnel.

In some embodiments, the at least one first object is a pair of skis; and the at least one second object is a pair of ski poles.

In some embodiments, the second rack component is at least partially deformable; and the width of the top opening between the second end and the fourth end is changed by flexing of the second rack component relative to the first rack component.

According to another aspect of the present technology, there is provided an accessory rack kit for a vehicle. The kit includes two accessory rack assemblies, each of the assemblies being an accessory rack assembly according to the above embodiments; two attachment frames for connecting the assemblies to a vehicle; and a plurality of fasteners for connecting the attachment frames to the vehicle.

In some embodiments, the at least one first object being a pair of skis, the pair of skis being disposed in the first passage portion of and extending between the two accessory rack assemblies when the assemblies are installed on the vehicle; and the at least one second object being a pair of ski poles, the pair of ski poles being disposed in the second passage portion of and extending between the two accessory rack assemblies when the assemblies are installed on the vehicle.

In some embodiments, the accessory rack kit further includes a snowboard; and the snowboard is disposed in and extending between the two accessory rack assemblies when the assemblies are installed on the vehicle; and the snowboard extends into the first passage portion and the second passage portion of each of the two accessory rack assemblies, the snowboard being disposed between the at least one protrusion and the second rack component.

For purposes of the present application, terms related to spatial orientation of elements described herein, such as "left", "right", "top", "bottom", "upper", "lower" "above" and "below", are as they would normally be understood by a driver of the vehicle sitting thereon in a normal riding position. The spatial orientation of the assemblies described herein is as it would be arranged when installed on a left side of a vehicle. When installed on a right side of a vehicle, the spatial orientations will generally be reversed.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
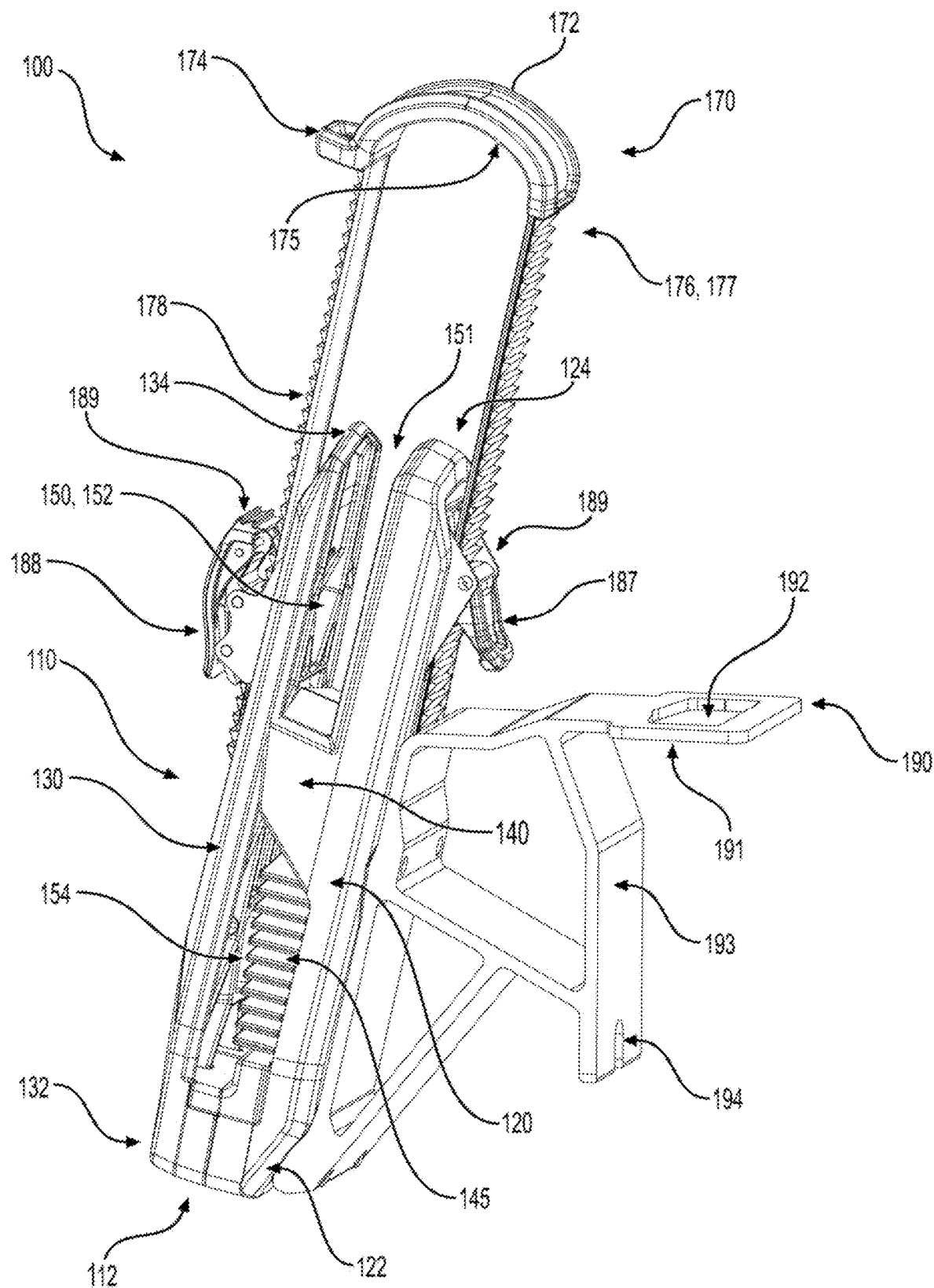
FIG. 1 is a rear, right side perspective view of an accessory rack assembly for connecting to a vehicle.

It should be noted that the Figures may not be drawn to scale.

DETAILED DESCRIPTION

The present technology of an accessory rack assembly 100 will be described with reference to a snowmobile 40 having a tunnel 50, but it is contemplated that the present technology could also be applicable to all-terrain vehicles (ATVs), and other vehicles transporting elongated cargo. It is noted that particulars of the snowmobile 40 beyond the tunnel 50 are outside the scope of the present description and therefore will not be further detailed. One non-limiting example of a construction of such a snowmobile may be found in U.S. Pat. No. 10,744,953, issued on Aug. 18, 2020.

The accessory rack assembly 100, also referred to herein as the assembly 100, is illustrated in FIGS. 1 to 4. The assembly 100 is arranged, as will be described in detail below, to secure skis and/or ski poles or a snowboard (referred to herein generally as cargo) to a vehicle, such as the snowmobile 40 (FIGS. 5, 6, and 8 to 10). While it may not always be the case, a pair of accessory rack assemblies 100 is used on the snowmobile 40 in the illustrated embodiments to hold the skis and ski poles or snowboard.

The accessory rack assembly 100 includes a rack structure 110 for receiving the cargo to be transported by the vehicle. The rack structure 110 is generally U-shaped, with a closed bottom end 112 and an open top end 114. In some embodiments, the rack structure 110 could be generally V-shaped. The rack structure 110 is formed from one rack component 120 connected to another rack component 130. In some embodiments, the two components 120, 130 could be integrally formed, such that the rack structure 110 is a single piece. Each component 120, 130 is generally rectangularly shaped, with rounded edges and corners, but it is contemplated that the exact form could vary.

The component 120 includes a bottom end portion 122 and a top end portion 124. The component 120 is formed from a rigid material, specifically rigid plastic in the present embodiment. It is contemplated that different materials could be used, including but not limited to, metal, fiberglass, and rubber. The component 130 includes a bottom end portion 132 and a top end portion 134. In the present embodiment, the component 130 is formed from a deformable material, such that the top end portion 134 of the component 130 can flex toward the top end portion 124 of the component 120 (described further below). In the present case the component 130 is formed from plastic, but it is contemplated that different materials could be used, including but not limited to: metal, fiberglass, rubber, and a combination of different materials to form a semi-deformable component 130. In some embodiments, for example, the lower portion of the component 130 could be rigid and the upper portion could be deformable. It is also contemplated that the component 120 could be formed, in its entirety or in part, from a deformable material.

Figure 4:
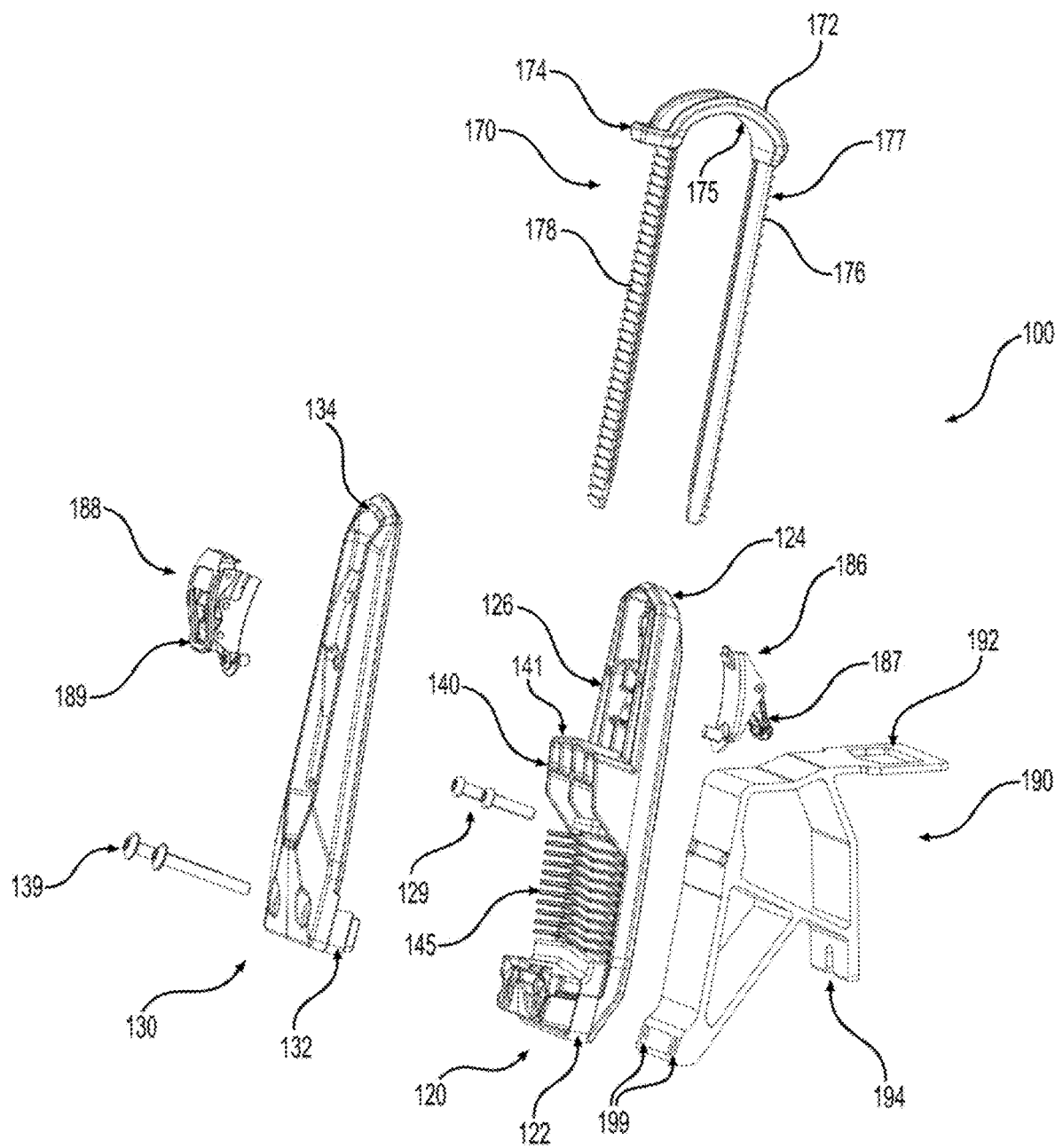
FIG. 4 is an exploded view of the accessory rack assembly of FIG. 1.

The components 120, 130 are fastened together at the bottom end portions 122, 132. As is illustrated in FIG. 4, the portions 122, 132 are shaped to have an interlocking fit to aid in maintaining the connection therebetween and two screws 139 are secured through the portions 122, 132. The two components 120,130 extend in a same general upward direction from the connected end portions 122, 132.

Figure 2:
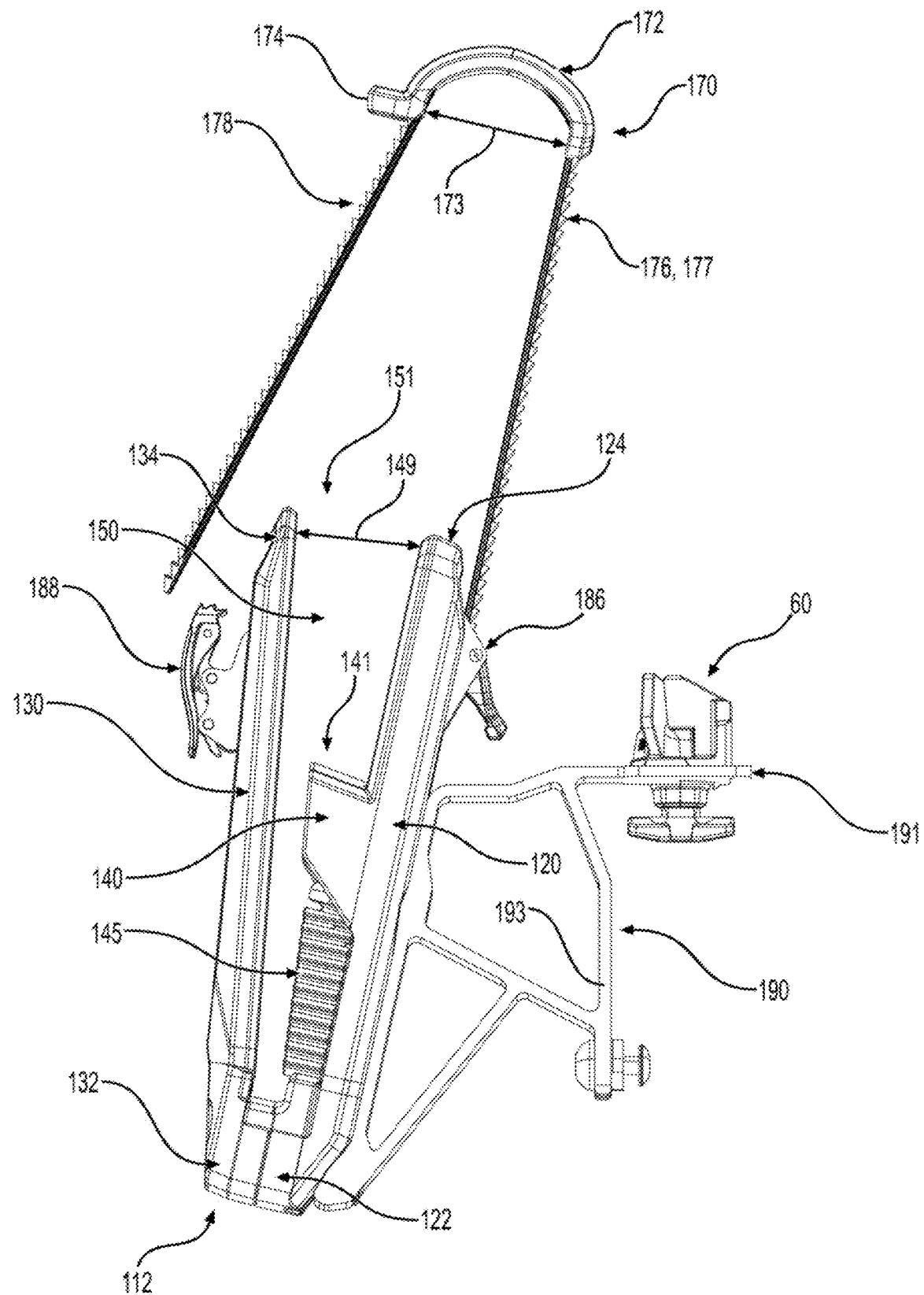
FIG. 2 is a rear elevation view of the accessory rack assembly of FIG. 1, with the assembly in an open position.

The rack structure 110 is adjustable between at least a closed position (illustrated in FIGS. 1 and 3) and an open position (illustrated in FIG. 2). In the open position, the components 120, 130 angle slightly away from each other. In the closed position, the top end portion 134 of the component 130 is flexed toward the top end portion 124 of the component 120 and the components 120, 130 are approximately parallel. In the present embodiment, the change in form of the rack structure 110 is enabled by the at least partially flexible component 130. Although referred to herein as only one closed position, it is noted that the exact position of the component 130 relative to the component 120 could vary, depending on the force applied to bring the component 130 into the closed position. In some embodiments, it is contemplated that the component 130 could be formed by a rigid material and the rack structure 110 could further include a biasing member (for instance, a spring) to allow for connection and relative movement of the components 120, 130.

The components 120, 130 define an accessory passage 150 of the rack structure 110 therebetween. The accessory passage 150 is sized and arranged for receiving and securing therein one or more accessories or cargo to be transported by the vehicle. The present embodiment is configured for securing and transporting skis, skis poles, and snowboards. Some embodiments could be differently arranged for transporting different cargo, for instance for transporting snowshoes. The top end portions 124, 134 define therebetween a top opening 151 of the accessory passage 150. A width 149 of the top opening 151 is changeable by movement of the component 130 relative to the component 120 between the open and closed positions. In the open position, the width 149 is larger to facilitate insertion of the cargo to be secured therein; in the closed position, the width 149 is smaller to aid in maintaining the cargo in the assembly 100.

The component 120 includes a protrusion 140 connected to and extending outward from an inner surface 126 of the rack component 120 into the accessory passage 150. In the present embodiment, the protrusion 140 is integrally formed with the component 120. In some embodiments, the protrusion 140 could be fastened or otherwise attached to the component 120.

The protrusion 140 separates the accessory passage 150 into an upper passage portion 152 and a lower passage portion 154. In the open position of the rack structure 110, the protrusion 140 extends across a majority of the accessory passage 150, without contacting the component 130. This facilitates inserting cargo into the lower passage portion 154, via the top opening 151 of the passage 150. In the closed position, the protrusion 140 may or may not contact the component 130, depending on the relative positioning of the component 130.

Figure 5:
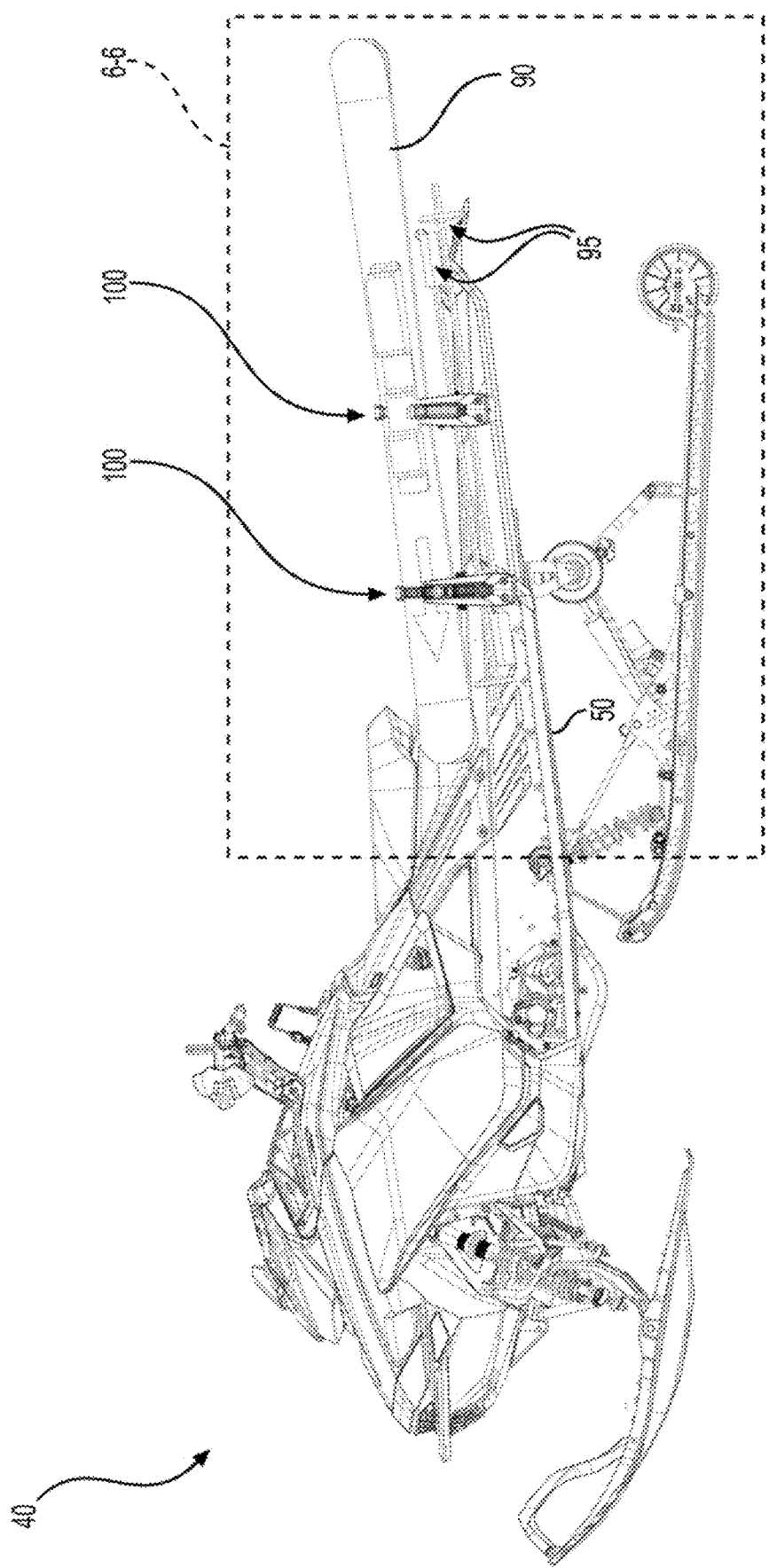
FIG. 5 is a left side elevation view of a snowmobile, with two skis and two ski poles attached to the snowmobile by two accessory rack assemblies of FIG. 1.
Figure 6:
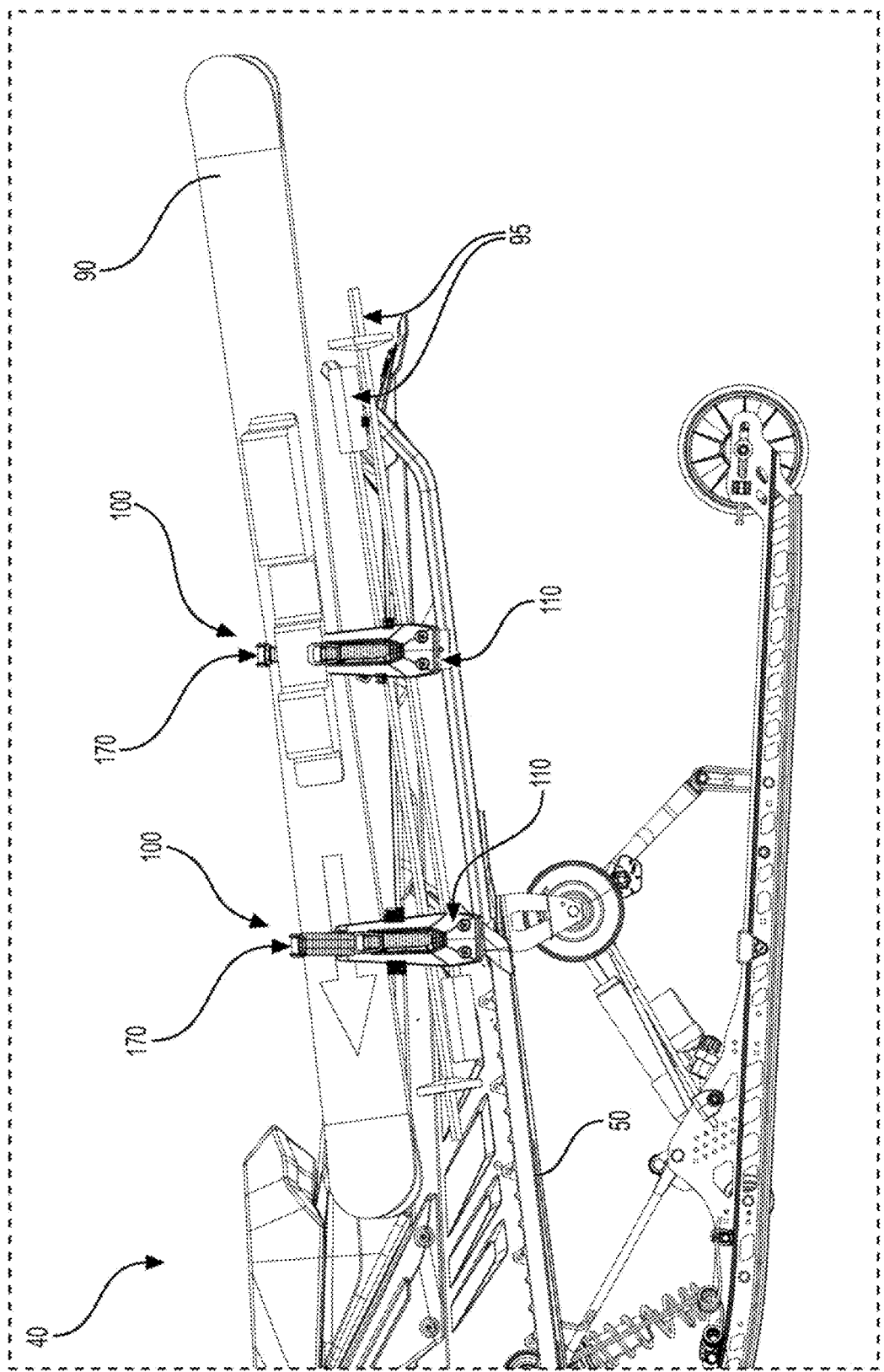
FIG. 6 is a close-up view of the snowmobile, skis, ski poles, and accessory rack assemblies of FIG. 5, taken from the box 6-6 of FIG. 5.
Figure 7:
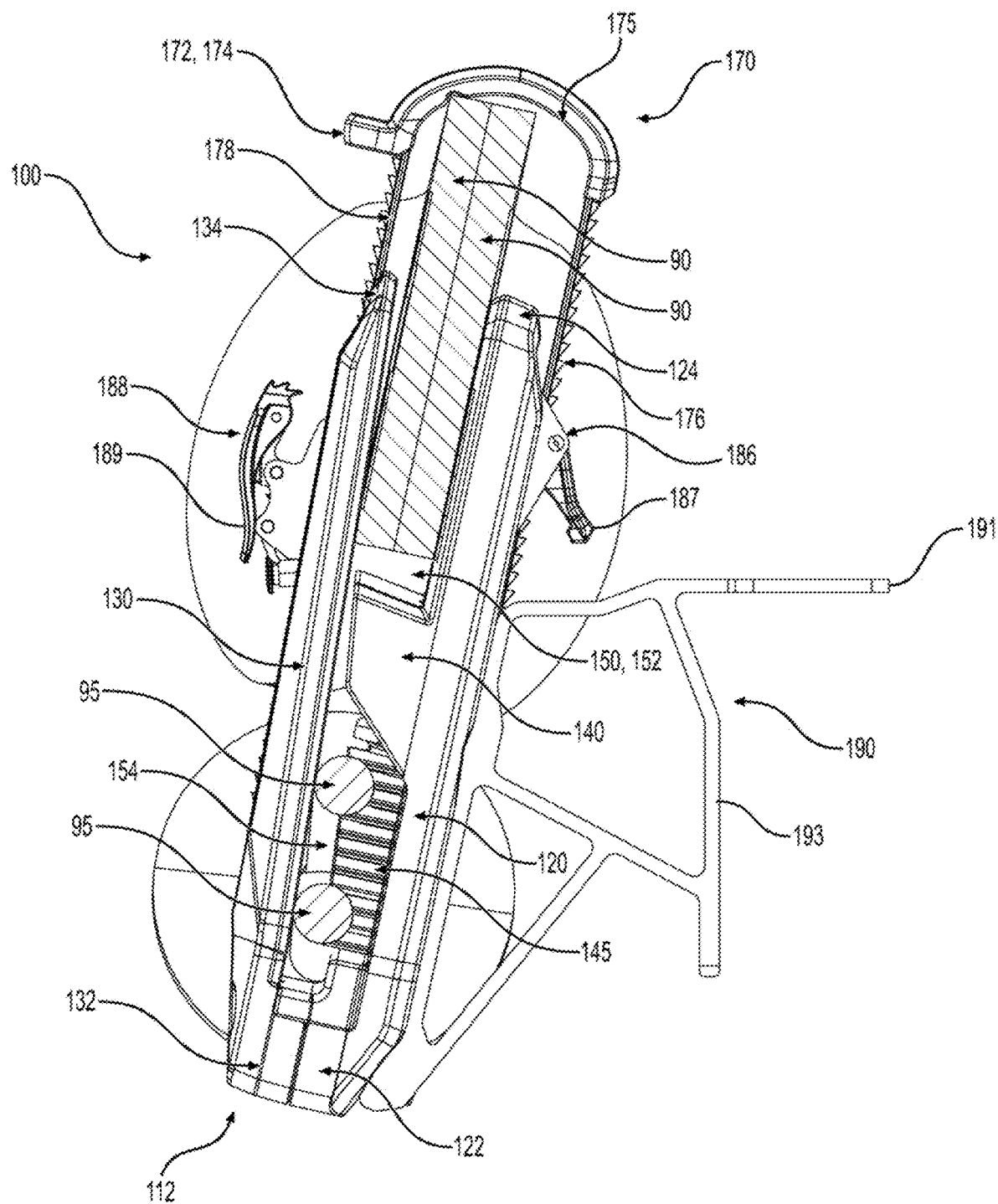
FIG. 7 is a cross-sectional view of the skis and ski poles as held by one of the accessory rack assemblies of FIG. 5.
Figure 8:
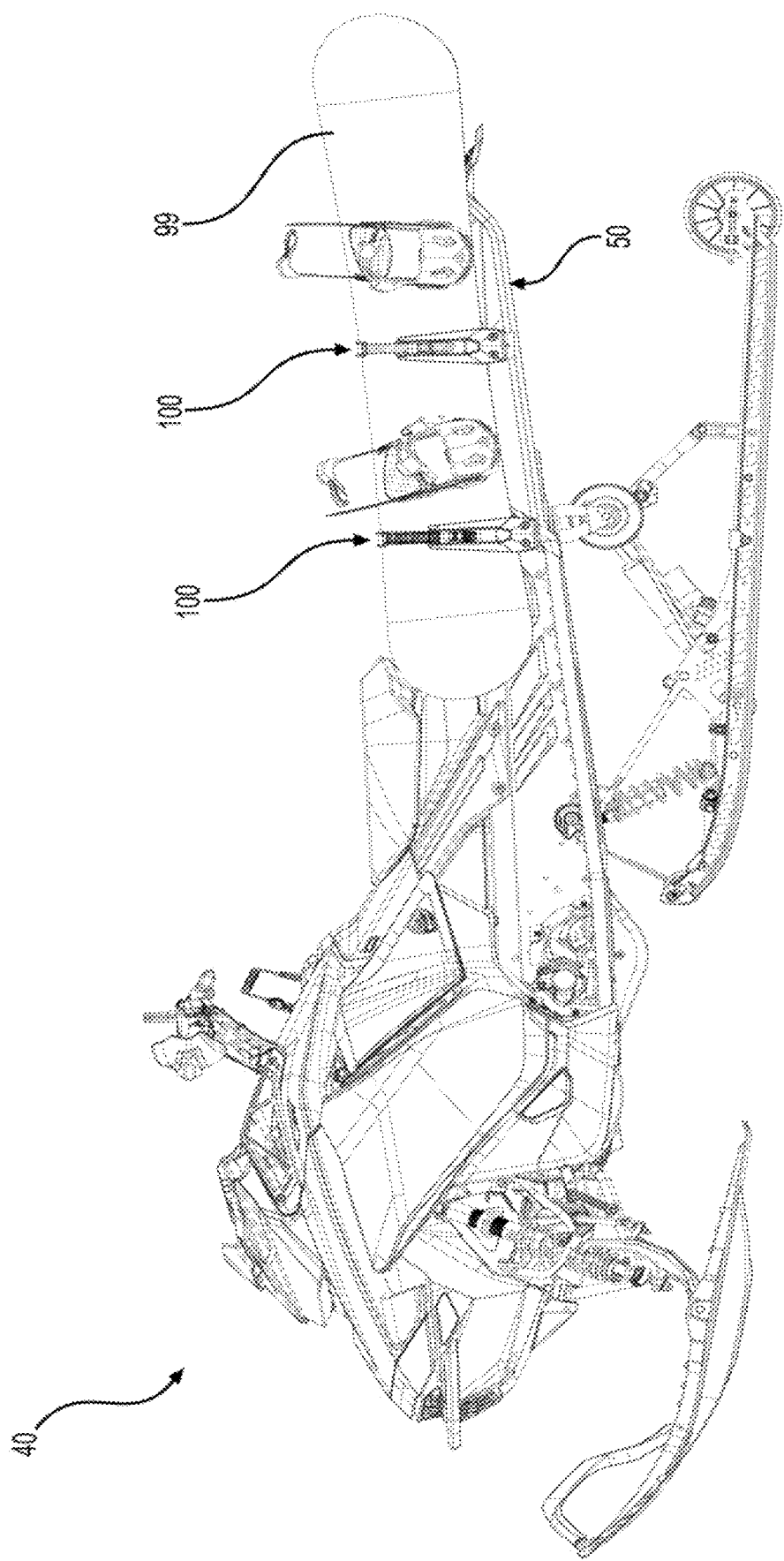
FIG. 8 is a left side elevation view of the snowmobile, with a snowboard attached to the snowmobile by two accessory rack assemblies of FIG. 1.

The protrusion 140 is configured for separating one or more objects disposed in the upper passage portion 152 from one or more objects disposed in the lower passage portion. With reference to FIGS. 5 to 7, the protrusion 140 is illustrated separating two skis 90 and two ski poles 95 secured in two assemblies 100 for transport on the snowmobile 40. The skis 90 and the ski poles 95 are disposed in and extend between two accessory rack assemblies 100 installed on the snowmobile 40.

The skis 90 are disposed in the upper passage portion 152 and are impeded from sliding down the passage 150 by the protrusion 140. The ski poles 95 are similarly maintained in the lower passage portion 154 by the protrusion 140 and the lower portion 112 of the rack structure 110. In this way, both the skis 90 and the ski poles 95 can be physically separated during transport, thereby preventing scratching or impacts between the skis 90 and the ski poles 95, while not requiring different racking equipment for the skis 90 and for the ski poles 95. The protrusion 140 also includes an angled top surface 141 to aid in preventing the skis 90 from twisting about their longitudinal axis in the assembly 100. In some embodiments, the protrusion 140 could be connected and extend from the component 130.

The rack component 120 also includes a compressible portion 145 extending from the surface 126 into the lower passage portion 154. In some embodiments, the compressible portion 145 could be disposed in the upper passage portion 152. In the present embodiment, the compressible portion 145 is formed from a series of generally rectangular flexible fin-like members 146 extending outward from the surface 126 into the lower passage portion 154. As is illustrated for the ski poles 95 in FIG. 7, the members 146 act to aid in securing one or more objects in the lower passage portion 154 which may be smaller in cross-section than the width of the lower passage portion 154. In some embodiments, it is contemplated that the compressible portion 145 could be implemented using other arrangements, including but not limited to, a block of compressible material (foam, for instance), flexible plastic, and rubber.

With reference to FIGS. 8 to 11, another non-limiting example of use of two assemblies 100 is illustrated, where a snowboard 99 transported on the snowmobile 40. The snowboard 99 is disposed in and extends between two accessory rack assemblies 100 installed on the snowmobile 40.

As the protrusion 140 extends across a majority, but not across the entirety of the accessory passage 150 when the rack structure 110 is in the open position, the snowboard 99 can also be transported by the same accessory rack assemblies 100 as the skis 90 and the ski poles 95 (although generally not simultaneously) without requiring additional or alternative racking equipment.

Figure 11:
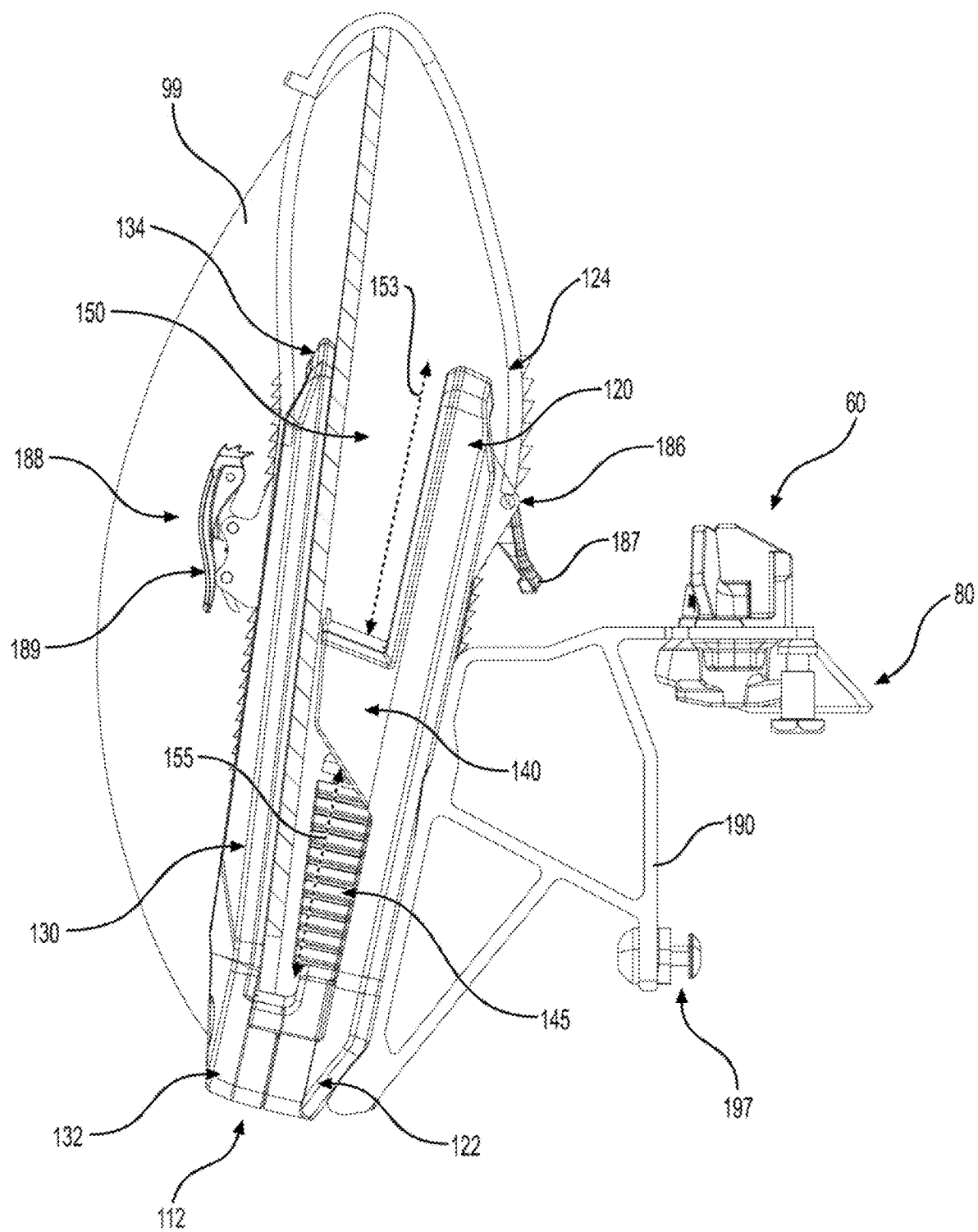
FIG. 11 is a cross-sectional view of the snowboard as held by one of the accessory rack assemblies of FIG. 9.

As can be seen in FIG. 11, the snowboard 99 has a height that is greater than a height 153 of the upper passage portion 152 and a height 155 of the lower passage portion 154. As the snowboard 99 does not fit completely in either of the passage portions 152, 154, the rack component 130 and the protrusion 140 are arranged to secure the snowboard 99 in the accessory passage 150. When received in the accessory passage 150, the snowboard 99 extends into the upper and lower passage portions 152, 154 and is disposed between the protrusion 140 and the rack component 130. The snowboard 99 is thus wedged between the protrusion 140 and the rack component 130, and is impeded from sliding down out of the rack structure 110 by the lower portion 112. In the present embodiment, the center rigid member 172 and the compressible portion 145 also include surface texture treatments to aid in preventing the accessories (i.e. the skis 90, the snowboard 99) from slipping forward and rearward during transport. The particular surface treatment could vary with different embodiments.

Figure 3:
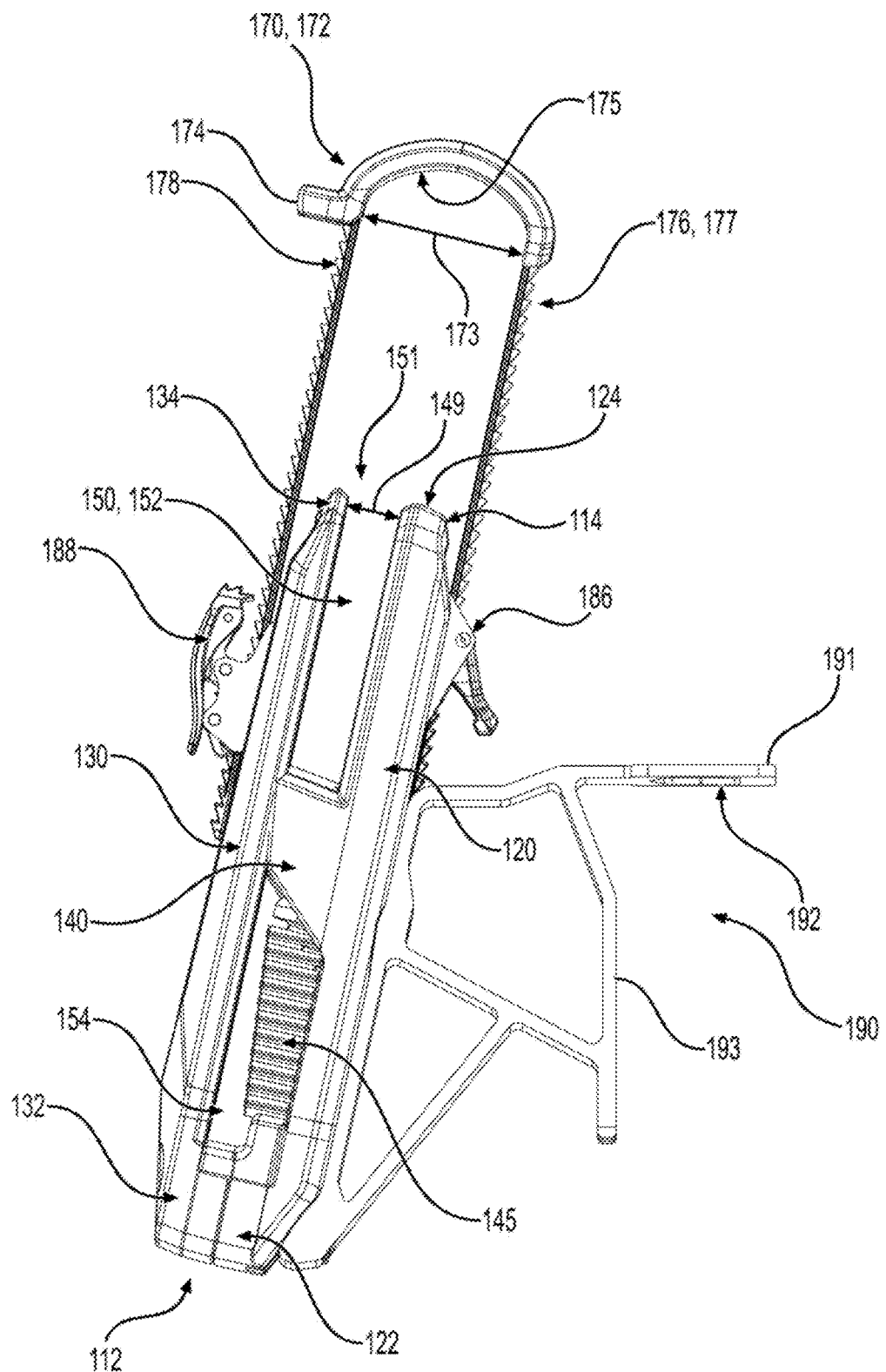
FIG. 3 is the rear elevation view of the accessory rack assembly of FIG. 2, with the assembly in a closed position.

The accessory rack assembly 100 further includes a securing member 170, also referred to herein as a strap 170, selectively connected to the rack structure 110. The securing member 170, when connected to the rack structure 100, extends over the top end portions 124, 134 to selectively partially close the top opening 151 of the accessory passage 150. The strap 170 thus brings the rack structure 100 into the closed position when tightened onto the rack structure 100. The securing member 170 is configured to be selectively tightened around or released from the rack structure 110, as can be seen in FIGS. 1 to 3. By securing and tightening the member 170, the rack structure 110 is brought to the closed position by flexing the component 130, and more specifically the top end portion 134, toward the top end portion 124.

In the present embodiment, the securing member 170 includes a center rigid member 172 and two ratchet strap portions 176, 178, the two portions 176, 178 forming a ratchet strap 177. The center member 172 is a rubber sleeve 172 disposed around the ratchet strap 177. In at least some embodiments, the center member 172 could be replaceable on the strap 177, in case of wear or damage to the center rigid member 172. In some embodiments, it is contemplated that the member 172 could be a solid component, with the ratchet strap portions 176, 178 being connected thereto to form the securing member 170.

The center member 172 is arc shaped, generally a three-centered arch shape in the illustrated embodiment. The arched center member 172 has an inner diameter 173 in the direction extending over the two components 120, 130 when the strap 170 is installed on the rack structure 110. As can be seen in FIGS. 1 and 3, the center rigid member 172 is sized and arranged to extend around and over the top end portions 124, 134 of the components 120, 130 when connected to the rack structure 110. The inner diameter 173 is greater than the width 149 of the top opening 151 of the passage 150 when the rack structure 110 is in the closed position. The inner diameter 173 is also greater than a total width of the top portion 114 of the rack structure 110 when in the closed position, such that the ratchet strap portions 176, 178 extend generally parallel from the ends of the center member 172 to external surfaces of the components 120, 130. It is noted that the exact relative angles between the strap portions 176, 178 depend on the degree to which the components 120, 130 are drawn together when being arranged in the closed position.

The strap 170 also includes a tab 174 extending outward from the center member 172. The tab 174 is arranged to aid in adjusting position of the strap 170 relative to the rack structure 110. It is contemplated that the center member 172 could be differently shaped in some embodiments. In some embodiments, for instance, the tab 174 could be differently sized or omitted. The strap 170 also includes a deformable material layer 175 connected to an inner surface of the center rigid member 172. As can be seen in FIG. 7, the layer 175 deforms to conform to an object received in and extending above the upper passage portion 152 when the strap 170 is tightened down around the rack structure 110.

Extending from the center rigid member 172 are the two ratchet strap portions 176, 178 of the ratchet strap 177. One ratchet strap portion 176 extends from one end of the center rigid member 172 and is arranged to selectively connect to the rack component 120. The other strap portion 178 extends from the opposite end portion of the member 172, near an inward end of the tab 174 and is arranged to selectively connect to the rack component 130.

In order to receive and secure the ratchet strap 177, the rack structure 110 includes two ratchet buckles 186, 188. The ratchet buckle 186 is connected to an exterior surface of the rack component 120. In the present embodiment, the buckle 186 is specifically a ratchet adjuster 186 and is generally used to perform the final tightening when connecting accessories using the assemblies 100. The ratchet buckle 188 is similarly disposed on an exterior surface of the rack component 130. In the present embodiment, the buckle 188 is specifically a lock/unlock adjuster for adjusting the placement of the securing member 170, for example when changing a placement of the securing member 170 from the position for holding skis to a position for holding a snowboard. The arrangement of the buckles 186, 188 could vary in different embodiments. It is noted that the "exterior" surfaces simply refer to the surfaces of the components 120, 130 opposite the surfaces forming the passage 150 ("interior surfaces"). In some embodiments, one or both of the ratchet buckles 186, 188 could be disposed in a cavity or passage in the components 120, 130, such that the ratchet strap portions 176, 178 are received in the components 120, 130.

In the present embodiment, the ratchet strap portions 176, 178 are ladder strap portions 176, 178, although different straps could be used in different embodiments. To connect the strap 170 to the rack structure 110, the ratchet strap portions 176, 178 are inserted into the ratchet buckles 186, 188 and the strap 170 is pushed toward the rack structure 110. In some cases, this can be performed by applying pressure to the center member 172. The tightness of the connected securing member 170 determines, at least in part, the position of the component 130 relative to the component 120 in the closed position. As the closed position can be adjusted simply by modifying the strap 170 tightness, the rack structure 110 can receive different thickness skis, for example, and the assembly 100 is thus not limited to any particular style or model of ski. Similarly, since the strap 170 has an adjustable position relative to the top portion 114 of the rack structure different size skis and snowboards can be accommodated.

During tightening of the strap 170 over the skis 90, for example, the center member 172 can slide along the strap 177, such that the center member 172 can remain in its correct placement on the skis 90 as one of the portions 176, 178 is secured.

With the use of ladder strap portions 176, 178, there is no need to manipulate the ratchet buckles 186, 188 for insertion: triangular teeth on the strap portions 176, 178 are angled to slide past a toothed lever 187, 189 (teeth illustrated for the lever 189) of the buckles 186, 188. When moving in the opposite direction, however, to remove the strap portions 176, 178 from the buckles 186, 188, the teeth abut the lever 187, 189. In order to remove the strap portions 176, 178 from the buckles 186, 188, the lever 187, 189 of the corresponding buckle 186, 188 is pivoted to allow the teeth to pass in the outward direction.

In some embodiments, it is contemplated that one or both of the ratchet strap portions 176, 178 could be implemented as fabric straps. In such a case, the ratchet buckles 186, 188 could be configured to apply a ratcheting action to the fabric ratchet straps.

The accessory rack assembly 100 further includes an attachment frame 190 connected to the rack structure 110. The attachment frame 190 is configured for selectively connecting the rack structure 110 to the snowmobile 40; see for example FIG. 10. The attachment frame 190 is formed from a plurality of extruded aluminum frame members, but the attachment frame 190 could be formed from various materials, including but not limited to: plastic and steel. It is also contemplated that the particular shape and size of the attachment frame 190 could vary.

As can be seen in FIG. 4, the rack component 120 is fastened to the attachment frame 190 by two screws 129. The screws 129 extend through two through-holes (not shown) in the component 120 and engage with tapped holes 199 of the attachment frame 190. The rack structure 110 is further fastened to the attachment frame 190 by the two screws 139 connecting the bottom end portions 122, 132. The screws 139 extend through through-holes defined in the bottom end portion 132, then through through-holes defined in the bottom end portion 122, and finally engage with tapped holes 199 of the attachment frame 190. It is contemplated that the rack structure 110 could be connected to the attachment frame 190 through varying means, including but not limited to: welding and gluing. It is also contemplated that the rack component 120 or both components 120, 130 could be integrally formed with the attachment frame 190.

Figure 9:
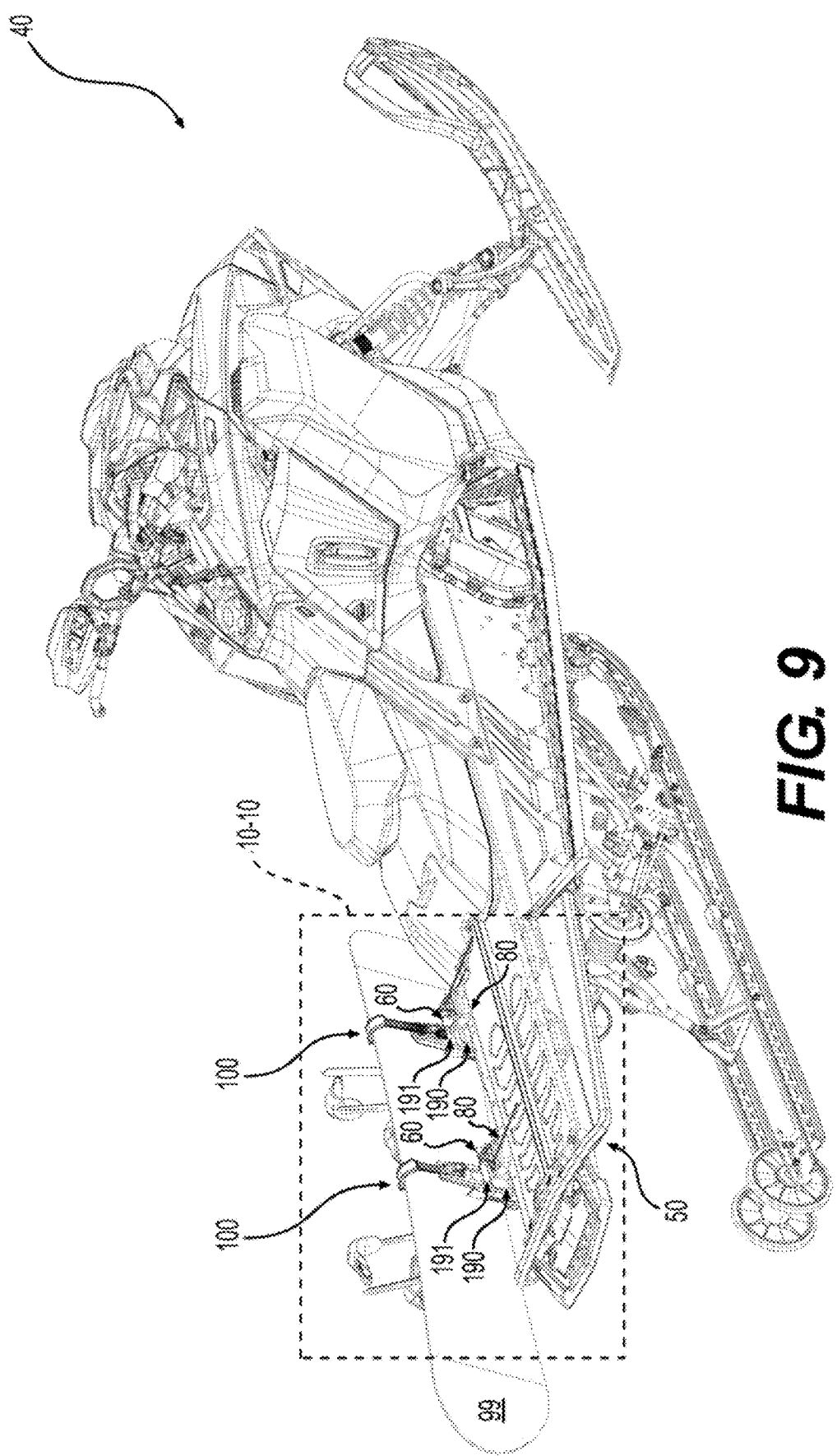
FIG. 9 is a rear, right side perspective view of the snowmobile, the snowboard, and the accessory rack assemblies of FIG. 8.
Figure 10:
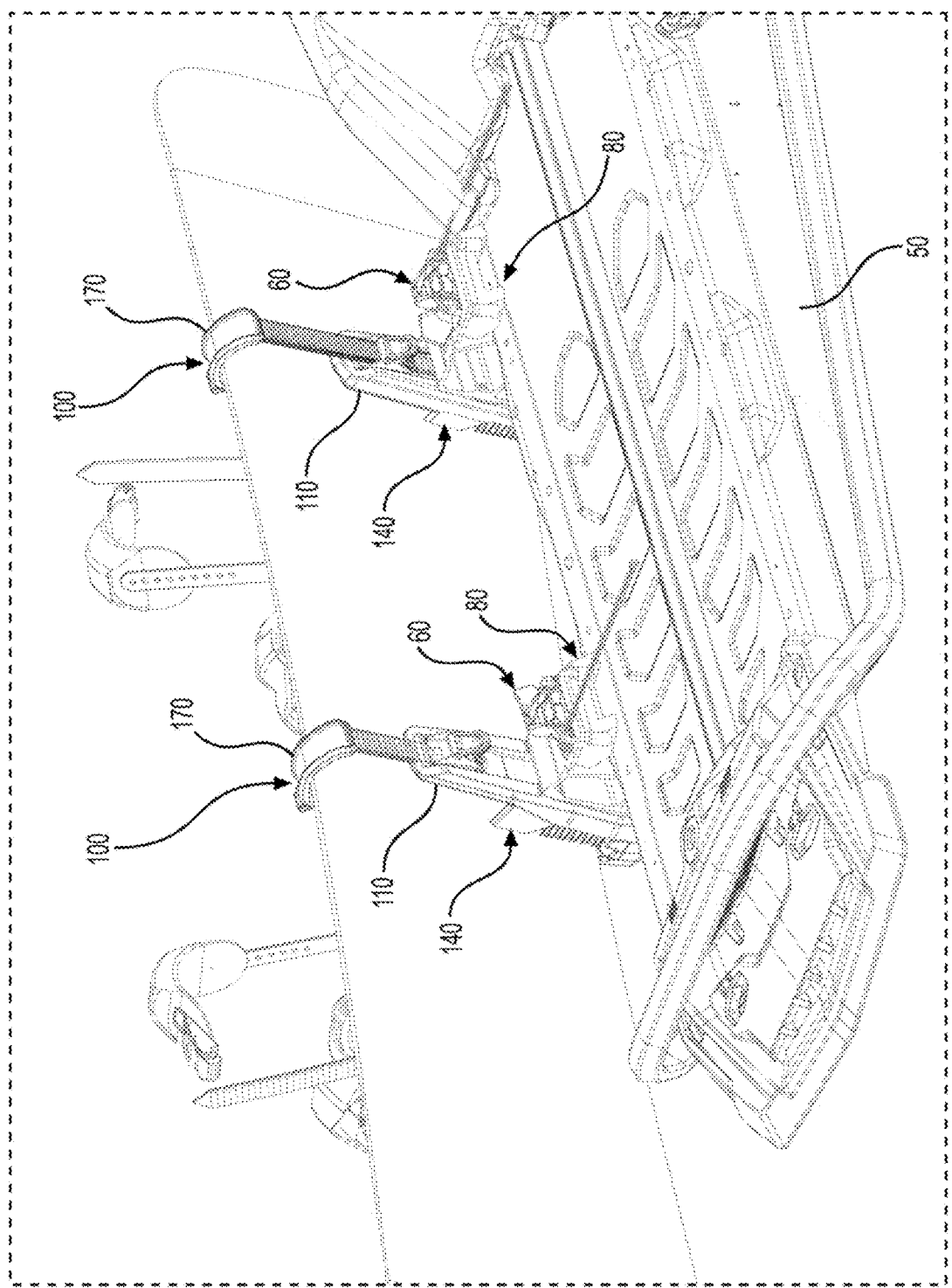
FIG. 10 is a close-up view of the snowmobile, the snowboard, and the accessory rack assemblies of FIG. 9, taken from the box 10-10 of FIG. 9.

The attachment frame 190 includes a top frame portion 191 arranged for connecting to a top surface of the snowmobile tunnel 50 (see FIG. 9). The attachment frame 190 also includes a side frame portion 193 extending generally downward from the top frame portion 191. The side frame portion 193 defines a through-hole 194 therethrough for receiving a fastener 197 (FIG. 11) for connecting to a side of the tunnel 50 specifically a bolt 197. In the illustrated embodiment, the through-hole 194 is in the form of a slot 194 although the form could change depending on the embodiment.

When connecting the attachment frame 190 to the snowmobile tunnel 50, the slot 194 is slid over the bolt 197 and the top frame portion 191 is connected to a top side of the tunnel 50. An aperture 192 is defined in the top frame portion 191 for receiving a fastener therethrough. In the present embodiment, the aperture 192 is sized and arranged for receiving an accessory anchor 60 therethrough for connecting the attachment frame 190 to a corresponding anchor fixture 80 connected to the tunnel 50. In some embodiments, the aperture 192 could be configured to receive different fasteners, such as screws or bolts.

Figure 12:
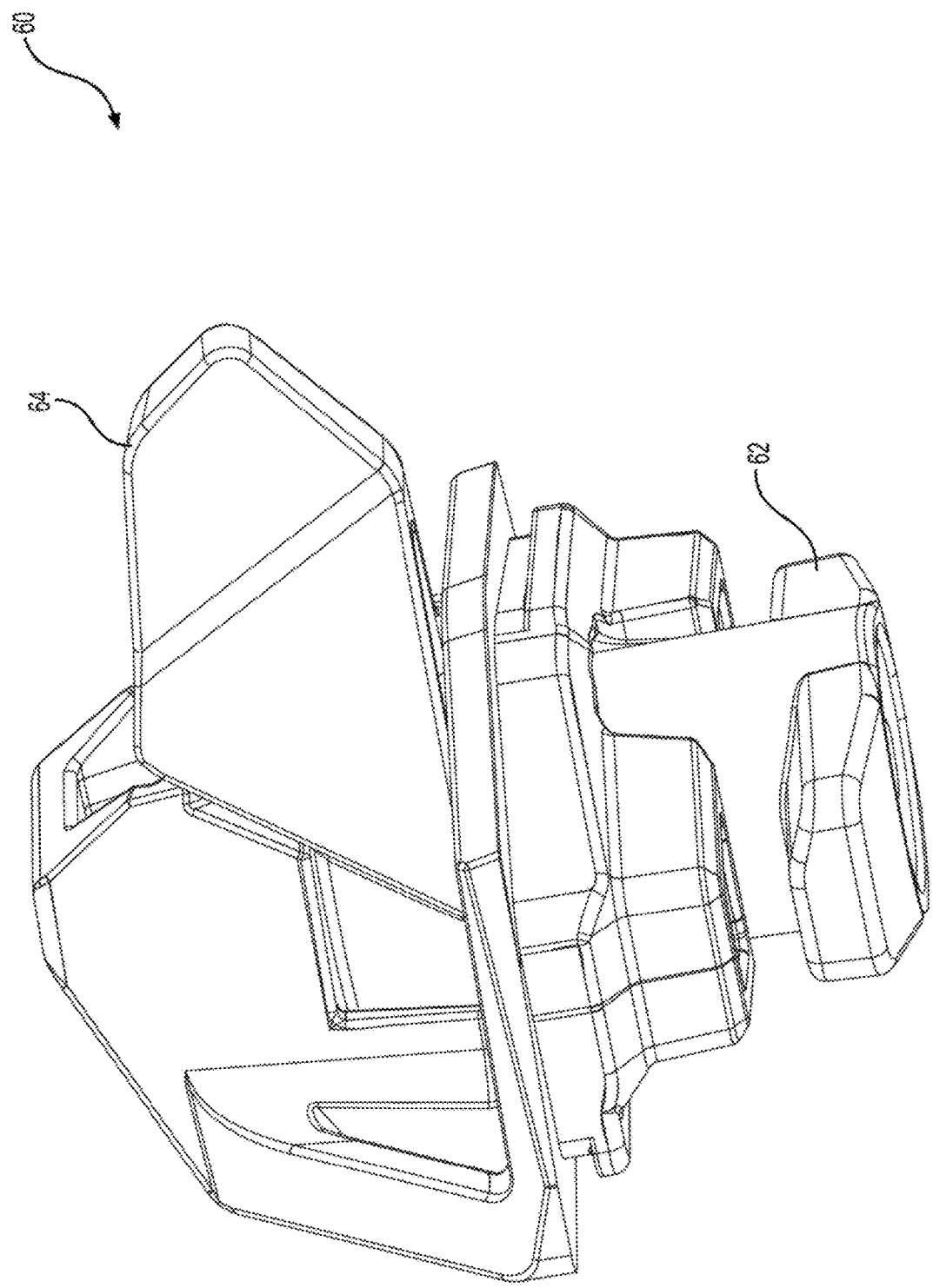
FIG. 12 is a perspective view of an accessory anchor of the assembly of FIG. 2.
Figure 13A:
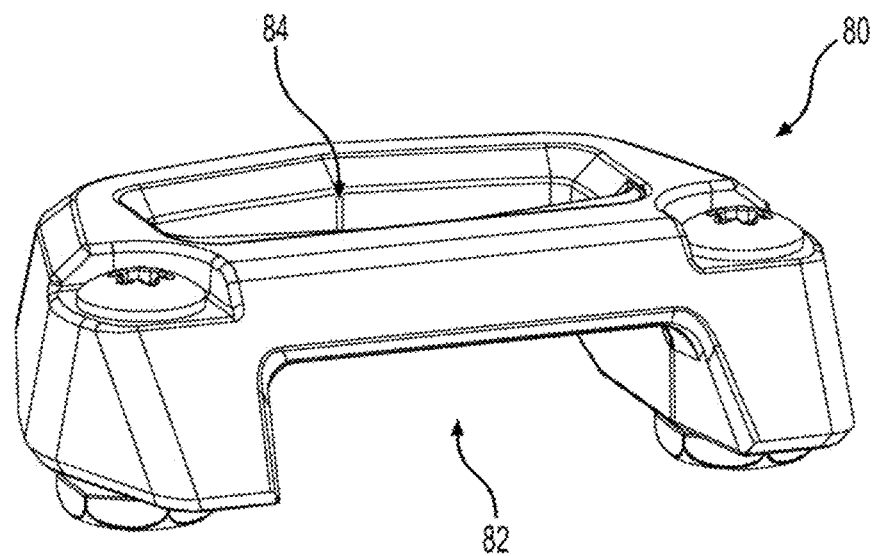
FIGS. 13A and 13B are perspective views of an anchor fixture of the snowmobile of FIG. 5.
Figure 13B:
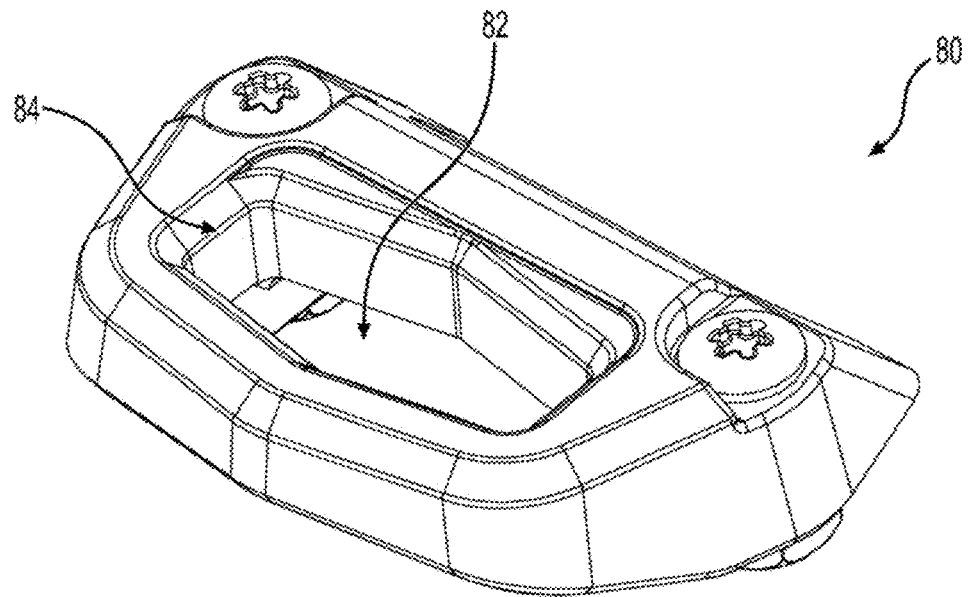

With reference to FIGS. 12, 13A, and 13B, the accessory anchor 60 and the anchor fixture 80 will be briefly described. The attachment frame 190 selectively connects to the snowmobile tunnel 50 using the anchor 60 disposed through the aperture 192 and selectively connecting to the anchor fixture 80 as mentioned above. For each assembly 100 to be connected to the tunnel, one corresponding anchor fixture 80 is fastened to the tunnel 50. In some embodiments, the snowmobile 40 may include the anchor fixtures 80 integrally formed with the tunnel 50.

Anchors and anchor fixtures of this type are described in detail in U.S. Pat. No. 9,751,592, issued Sep. 5, 2017, the entirety of which is incorporated herein by reference. Only a brief description of the anchors 60 and anchor fixtures 80 will therefore be provided herein.

Each anchor 60 has a fastener portion 62 and an actuator portion 64 operatively connected to the fastener portion 62. The fastener portion 62 is configured to be received in an anchor chamber 82 defined in part by the corresponding anchor fixture 80. The fastener portion 62 is movable between locked and unlocked positions. Notably, the actuator portion 64 is movable by a user to move the fastener portion 62 between the locked and unlocked positions thereof.

The fastener portion 62 is shaped such that, when the fastener portion 62 is received in the anchor chamber 82 defined by the corresponding anchor fixture 80, in the unlocked position, the fastener portion 62 is removable from the anchor fixture 80. Notably, an opening 84 of the anchor fixture 80, which opens into the anchor chamber 82, has a hexagonal shape which allows the similarly hexagonally-shaped fastener portion 62 to be removed therethrough in the unlocked position. Similarly, the fastener portion 62 is insertable into the anchor chamber 82 of the anchor fixture 80 in the unlocked position. Conversely, when the fastener portion 62 is received in the anchor chamber 82, in the locked position, the fastener portion 62 is retained by the anchor fixture 80 connected to the snowmobile 40 as the fastener portion 62 is not aligned with the opening 84 of the anchor fixture 80 and therefore cannot be removed therethrough.

Depending on the particular embodiment, the assembly 100 could be provided in the form of a kit of one assembly 100, including the rack structure 110, the strap 170, and the attachment frame 190, for connecting to a vehicle. In other embodiments, an accessory kit could be provided including two accessory rack assemblies 100, including two rack structures 110, two straps 170, and two attachment frames 190. In some embodiments, kits of one or two accessory rack assemblies 100 could also be provided with a plurality of fasteners for connecting the attachment frames 190 to the vehicle, including for example one or more accessory anchors 60. It is also contemplated that kits of one or two accessory rack assemblies 100 could be provided with one or more anchor fixtures 80 for adapting a snowmobile or other vehicle to receive the one or more assemblies 100.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. An accessory rack assembly for connecting to a vehicle, comprising:
   a rack structure including:
     a first rack component including a first end portion and a second end portion opposite the first end portion;
     a second rack component including a third end portion and a fourth end portion, the third end portion of the second rack component being connected to the first end portion of the first rack component; and
     a protrusion connected to and extending outward from first surface of the first rack component, the first surface extending between the first end portion and the second end portion,
     the first rack component and the second rack component defining an accessory passage therebetween, the protrusion extending from the first rack component into the accessory passage, the protrusion separating the accessory passage into a first passage portion and a second passage portion,
     the protrusion being configured for separating an at least one first object disposed in the first passage portion from an at least one second object disposed in the second passage portion,
     the second end portion of the first rack component and the fourth end portion of the second rack component defining therebetween a top opening of the accessory passage,
   the rack structure being adjustable between at least a closed position and an open position,
   in the open position:
     the first rack component and the second rack component are angled away from each other, and
     the protrusion extends across a portion of the accessory passage,
   in the closed position:
     the first rack component and the second rack component are arranged approximately parallel to each other, and
     the protrusion extends across the accessory passage from the first rack component to the second rack component,
   a distance between the second end portion and the fourth end portion being changeable by movement of the second rack component relative to the first rack component between the open position and the closed position; and
   a securing member selectively connected to the rack structure, the securing member extending over the second end portion and the fourth end portion to selectively partially close the top opening.

2. The accessory rack assembly of claim 1, wherein the first rack component includes a compressible portion extending from the first rack component into at least one of the first passage portion and the second passage portion.

3. The accessory rack assembly of claim 2, wherein the compressible portion includes a plurality of flexible members extending into the at least one of the first passage portion and the second passage portion.

4. The accessory rack assembly of claim 2, wherein:
   the second passage portion is located between the first end portion and the third end portion connected together and the protrusion; and
   the compressible portion extends into the second passage portion.

5. The accessory rack assembly of claim 1, wherein:
   the first passage portion has a first height extending along the first surface;
   the second passage portion has a second height extending along the first surface;
   the second rack component and the protrusion are arranged to secure an at least one third object in the accessory passage, a height of the at least one third object being greater than the first height of the first passage portion and the second height of the second passage portion; and
   when received in the accessory passage:
     the at least one third object extends into the first passage portion and the second passage portion, and
     the at least one third object is disposed between the protrusion and the second rack component.

6. The accessory rack assembly of claim 5, wherein the at least one third object is a snowboard.

7. The accessory rack assembly of claim 1, wherein:
   the securing member is configured to be selectively tightened around the rack structure; and
   when the securing member is at least partially tightened around the rack structure, the rack structure is at least partially moved from the open position to the closed position.

8. The accessory rack assembly of claim 1, further comprising:
   at least one ratchet buckle connected to the rack structure; and
   wherein:
     the securing member includes at least one ratchet strap; and
     the at least one ratchet buckle is arranged to selectively receive and tighten the at least one ratchet strap.

9. The accessory rack assembly of claim 1, wherein the securing member comprises:
   a center rigid member;
   a first strap connected to and extending from a first end of the center rigid member; and
   a second strap connected to and extending from a second end of the center rigid member.

10. The accessory rack assembly of claim 9, wherein:
   the center rigid member has an arc shape; and
   the center rigid member is sized and arranged, when connected to the rack structure, to extend around and over the second end portion of the first rack component and the fourth end portion of the second rack component.

11. The accessory rack assembly of claim 9, wherein the securing member comprises a deformable material layer connected to an inner surface of the center rigid member.

12. The accessory rack assembly of claim 9, wherein:
the first strap is a first ladder strap;
the second strap is a second ladder strap; and
the rack structure includes:
- a first ratchet buckle connected to a first exterior surface of the rack structure, the first ratchet buckle being arranged to selectively receive the first ladder strap, and
- a second ratchet buckle connected to a second exterior surface of the rack structure, the second ratchet buckle being arranged to selectively receive the second ladder strap.

13. The accessory rack assembly of claim 1, further comprising an attachment frame connected to the rack structure and configured for selectively connecting the rack structure to the vehicle.

14. The accessory rack assembly of claim 13, wherein the first rack component is fastened to the attachment frame.

15. The accessory rack assembly of claim 13, wherein:
the vehicle is a snowmobile including a tunnel; and
the attachment frame includes a top frame portion arranged for connecting to a top surface of the tunnel, an aperture being defined in the top frame portion, the aperture being sized and arranged for receiving an accessory anchor therethrough.

16. The accessory rack assembly of claim 15, wherein the attachment frame includes a side frame portion extending generally downward from the top frame portion, the side frame portion defining a through-hole therethrough for receiving a fastener for connecting to a side of the tunnel.

17. The accessory rack assembly of claim 1, wherein:
the at least one first object is a pair of skis; and
the at least one second object is a pair of ski poles.

18. The accessory rack assembly of claim 1, wherein:
the second rack component is at least partially deformable; and
the rack structure is adjusted between the closed position and the open position at least partially by flexing of the second rack component relative to the first rack component.

19. An accessory rack kit for a vehicle, the kit comprising:
two accessory rack assemblies, each of the assemblies being an accessory rack assembly according to claim 1;
two attachment frames for connecting the assemblies to a vehicle; and
a plurality of fasteners for connecting the attachment frames to the vehicle.

20. The accessory rack kit of claim 19, wherein:
the at least one first object being a pair of skis, the pair of skis being disposed in the first passage portion of and extending between the two accessory rack assemblies when the assemblies are installed on the vehicle; and
the at least one second object being a pair of ski poles, the pair of ski poles being disposed in the second passage portion of and extending between the two accessory rack assemblies when the assemblies are installed on the vehicle.

21. The accessory rack kit of claim 19, further comprising a snowboard; and
wherein:
the snowboard is disposed in and extending between the two accessory rack assemblies when the assemblies are installed on the vehicle; and
the snowboard extends into the first passage portion and the second passage portion of each of the two accessory rack assemblies, the snowboard being disposed between the protrusion and the second rack component.

* * * * *